United States Patent [19]
Weyer

[11] Patent Number: 5,148,885
[45] Date of Patent: Sep. 22, 1992

[54] STEERABLE UTILITY VEHICLE

[76] Inventor: Paul P. Weyer, P.O. Box 398, Enumclaw, Wash. 98022

[21] Appl. No.: 677,303

[22] Filed: Mar. 29, 1991

[51] Int. Cl.⁵ .................. B60K 17/14; B60K 17/30; B62D 5/06
[52] U.S. Cl. ........................... 180/253; 92/32; 180/6.3; 180/6.48; 180/238; 180/242; 180/305; 180/308
[58] Field of Search .............. 180/132, 305, 306, 307, 180/308, 242, 6.3, 6.48, 253, 238, 162; 92/32

[56] References Cited

U.S. PATENT DOCUMENTS

| 3,865,207 | 2/1975 | Schwab et al. | 180/253 |
| 3,961,681 | 6/1976 | Fisher | 180/305 |
| 4,691,795 | 9/1987 | Wehmeyer et al. | 180/6.48 |

FOREIGN PATENT DOCUMENTS

| 1120290 | 12/1961 | Fed. Rep. of Germany | 180/253 |
| 1239743 | 7/1971 | United Kingdom | 180/253 |

Primary Examiner—Mitchell J. Hill
Attorney, Agent, or Firm—Seed and Berry

[57] ABSTRACT

A utility vehicle having two steerable front wheels. Left and right-fluid powered rotary actuators have their bodies rigidly attached to the vehicle frame with their drive shafts attached to wheel brackets. The front wheels are each attached to one of the wheel brackets. Each actuator includes a pair of fluid ports, and a piston sleeve which reciprocates within the body of the actuator to rotate the drive shaft relative to the body through a range of at least 180°. Fluid conduit interconnects the ports of the two actuators in series, and with a fluid-control steering valve. Operation of the valve selectively applies pressure to the piston sleeves of the actuators to simultaneously rotate their drive shafts and, thus, the left and right front wheels in unison and in substantially equal angular amounts through a steering range of at least 180°. A motor provides drive to one of the front wheels to facilitate movement of the vehicle forward end when it is not desirable to drive the rear wheels. The rear wheels utilize a second identical steering system.

10 Claims, 2 Drawing Sheets

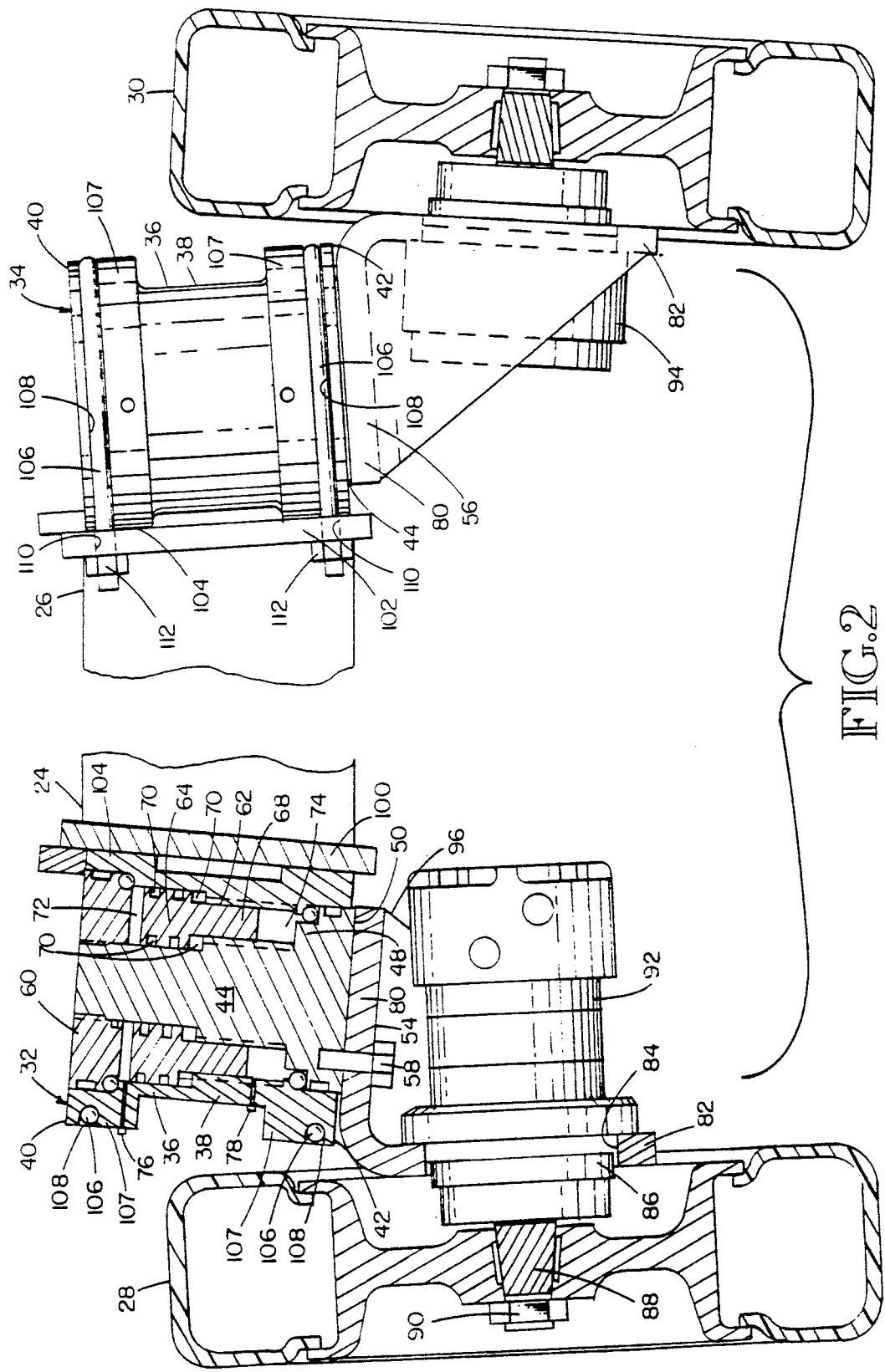

STEERABLE UTILITY VEHICLE

TECHNICAL FIELD

The present invention relates generally to utility vehicles, and more particularly, to steering systems for utility vehicles.

BACKGROUND OF THE INVENTION

In the past, self-propelled utility vehicles, such as scissor lifts and other equipment have had limited steering capability, which reduced their usefulness to the user. Typically, a four-wheel scissor lift vehicle has two fixed wheels and two steerable wheels, but the steerable wheels have a limited range of steering. With such an arrangement, it is difficult to steer the vehicle to the desired position. For example, when using a scissor lift next to a wall so that the platform being supported by the scissor lift can be positioned immediately adjacent and parallel to the wall, a large area is required for maneuvering. This is so the vehicle can be moved back and forth until it is in the desired position. Unfortunately, adequate area is not always provided, such as when working within buildings where obstructions and limited space prevent the required back-and-forth movement of the vehicle, or make the process of maneuvering the vehicle so slow and difficult that the user cannot take the time or the risk involved to properly position the vehicle. The longer the vehicle, the worse the situation becomes.

It will therefore be appreciated that there has long been a significant need for a utility vehicle with improved steering which increases the maneuverability of the vehicle. Preferably, the steering system will allow the steerable wheels a total steering range of at least 180°, with 90° steering to each side of a center position. With such an arrangement, one end of the utility vehicle can be positioned adjacent the wall and the steerable wheels turned 90° to cause the other end of the utility vehicle to move directly toward the wall. This would allow a quick and easy positioning of the utility vehicle in the desired position adjacent and parallel to the wall. If desired, the steering system should allow the forward wheels and the rearward wheels to be separately steered for increased maneuverability. The steering system must not only provide a sufficient steering range, but must also produce sufficient torque to turn the steerable wheels when the vehicle is fully loaded. The present invention fulfills these needs and further provides other related advantages.

SUMMARY OF THE INVENTION

The present invention resides in a vehicle having a support frame extending between first and second frame ends, and having left and right sides. The vehicle includes a pair of left and right first end wheels, with the left first wheel being positioned toward the left side of the frame first end, and the right first wheel being positioned toward the right side of the frame first end. A pair of left and right fluid-powered rotary actuators are provided. The left actuator is positioned toward the left side of the frame first end, and the right actuator is positioned toward the right side of the frame first end.

Each of the actuators includes a body having a longitudinal axis and a pair of body ends. First and second fluid ports are provided for introducing pressurized fluid within the body at longitudinally spaced apart locations. A drive member extends generally longitudinally and coaxially within the body, and is supported for rotational movement relative to the body. A piston is mounted within the body with the first port in fluid communication with one side thereof, and the second port in fluid communication with an opposite side thereof, to produce reciprocal longitudinal movement of the piston within the body in response to the selective application of pressurized fluid to the first and second ports.

The actuator also includes a torque transmitting member mounted for reciprocal longitudinal movement within the body. The torque transmitting member engages the body and the drive member to translate longitudinal movement of the piston toward one of the body ends into rotational movement of the drive member relative to the body in a first rotational direction, and longitudinal movement of the piston toward the other of the body ends into rotational movement of the drive member relative to the body in a second rotational direction opposite the first rotational direction. Either the body or the drive member is rigidly attached to the frame, and the other has an attachment portion which is rotatable relative to the frame.

The vehicle further includes a pair of left and right wheel brackets. The left wheel bracket is mounted to the attachment portion of the left actuator for rotation therewith, and the right wheel bracket is mounted to the attachment portion of the right actuator for rotation therewith. The left first wheel is rotatably mounted to the left first wheel bracket in a position to rollingly support the frame. The right first wheel is rotatably mounted to the right wheel bracket in a position to also rollingly support the frame. The left and right wheel brackets are rotatable by the left and right actuators to turn the left and right first wheels to steer the frame to the left or right. A motor is drivably coupled to one of the left or right first wheels to provide rotational drive power thereto.

The vehicle also has a fluid actuator valve, and a source of pressurized fluid connected to the fluid-control valve. Fluid conduit interconnects the first and second ports of the first and second actuators for series operation.

In particular, the fluid conduit includes a first conduit connecting the fluid-control valve to the first port of the left actuator, a second conduit connecting the second port of the left actuator to the first port of the right actuator, and a third conduit connecting the second port of the right actuator to the fluid-control valve. The fluid-control valve is operable to selectively apply pressurized fluid to the first conduit or the third conduit, and hence to the pistons of the left and right actuators to simultaneously rotate the attachment portions, and thereby turn the left and right first wheels in unison and in substantially equal angular amounts to steer the frame to the left or right.

At least one second end wheel is mounted to the frame toward the frame second end in position to rollingly support the frame.

In a preferred embodiment of the invention, the left and right actuators are rotatable through at least 180° to allow selective steering of the left and right first wheels at least 90° to the left and at least 90° to the right from a center position at which the vehicle moves forward in a straight line.

In this embodiment, the left and right actuators are oriented generally vertically, and each is positioned above a corresponding one of the left and right wheel brackets. The wheel brackets each are constructed of two portions, with the first portion being oriented generally horizontally and rigidly attached to the attachment portion of a corresponding one of the left and right actuators. The second portion is oriented generally vertically and has a corresponding one of the left and right first wheels rotatably mounted thereto.

The support frame of this embodiment also includes a left and right mounting pads, and the bodies of the left and right actuators each have a flat side positionable against a corresponding one of the left and right mounting pads. Members, such as U-bolts, hold the flat side portions of the bodies in fixed position against the mounting pads. The attachment portions of the left and right actuators are formed on the ends of the drive members of the actuators.

Other features and advantages of the invention will become apparent from the following detailed description, taken in conjunction with the accompanying drawings.

BRIEF DESCRIPTION OF THE DRAWINGS

FIG. 2 is an enlarged, sectional, fragmentary view of the utility vehicle of FIG. 1, showing the steering system used for the forward wheels of the vehicle.

DETAILED DESCRIPTION OF THE INVENTION

Figure 1:
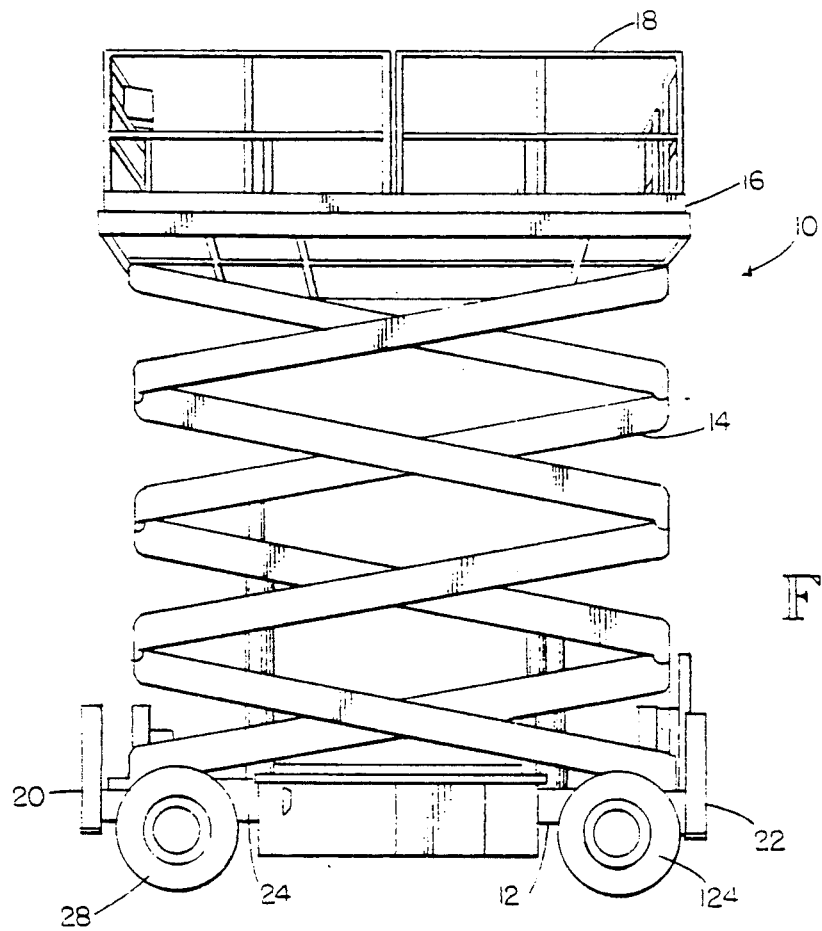
FIG. 1 is a left side elevational view of a utility vehicle embodying the present invention.

As shown in the drawings for purposes of illustration, the present invention is embodied in a self-propelled utility vehicle 10. While the vehicle 10 is illustrated as a scissor lift, the vehicle may have other constructions. The illustrated vehicle 10 includes an elongated support frame 12 which supports a hydraulically powered scissor lift mechanism 14 of conventional design. A platform 16 with handrails 18 is mounted atop the scissor lift mechanism 14.

The support frame 12 extends between front and rear frame ends 20 and 22, respectively, and has left and right sides 24 and 26, respectively. The vehicle 10 includes a pair of steerable left and right front end wheels 28 and 30, respectively. The left front wheel 28 is positioned toward the left side 24 of the frame front end 20, and the right front wheel is positioned toward the right side 26 of the frame front end.

As illustrated in FIG. 2, the vehicle 10 includes a pair of left and right fluid-powered rotary actuators 32 and 34, respectively, for steering of the front wheels 28 and 30, as will be described in detail below. The left actuator 32 is positioned toward the left side 24 of the frame front end 20, and the right actuator 34 is positioned toward the right side 26 of the frame front end.

Each of the left and right actuators 32 and 34 includes an elongated housing or body 36 having a cylindrical sidewall 38, and upper and lower ends 40 and 42, respectively. A rotary drive shaft 44 is coaxially positioned within the body 36 and supported for rotation relative to the body. The internal construction of the actuators 32 and 34 is best illustrated in the cross-sectional view of the left actuator 32 shown in FIG. 2. In the illustrated embodiment of the invention, both actuators have the same design, but it is to be recognized that alternative designs for the actuators can be used.

In the illustrated embodiment, the actuator drive shaft 44 has an elongated portion 46 axially projecting substantially the full length of the body 36 and a radially outward projecting flange portion 48 at the body lower end 42. The shaft flange portion 48 protrudes only slightly beyond the body lower end 42 and has a flat outward-facing mounting surface 50. The shaft flange portion 48 has a plurality of outwardly opening threaded attachment holes 52 circumferentially spaced thereabout.

Left and right wheel brackets 54 and 56, respectively, are each rigidly attached to the drive shaft mounting surface 50 of a corresponding one of the left and right actuators 32 and 34 by a plurality of fastening bolts 58 received in the threaded holes 52. The wheel brackets 54 and 56 rotate with the drive shaft 44 to which attached relative to the body 36 of the actuator. It is to be understood that the invention may be practiced with the drive shaft 44 providing rotation to the wheel bracket 54 or 56 with the body 36 of the actuator rigidly attached to the frame 12, such as illustrated, or with the drive shaft rigidly attached to the frame and the body attached to the wheel bracket to provide rotational drive thereto.

The elongated shaft portion 46 has an annular end cap 60 attached thereto at the body upper end 40 and rotates with the drive shaft.

An annular piston sleeve 62 is coaxially and reciprocally mounted within the body 36 about the elongated shaft portion 46 of the drive shaft 44. The piston sleeve 62 has a head portion 64 positioned toward the body upper end 40, and a cylindrical sleeve portion 68 fixedly attached to the head portion and extending axially therefrom toward the body lower end 42 The head portion 64 carries pairs of conventional inner and outer seals 70 to provide a fluid-tight seal between the head portion and corresponding smooth wall portions of the drive shaft 44 and the body sidewall 38. The head portion 64 defines upper and lower fluid-tight compartments 72 and 74 to each side of the head portion, respectively.

Reciprocation of the piston sleeve 62 within the body 36 occurs when hydraulic oil, air or any other suitable fluid under pressure selectively enters through one or the other of an upper port 76 which leads to the upper compartment 72 or a lower port 78 which leads to the lower compartment 74. Conventional seals are utilized to prevent fluid leakage from the compartments 72 and 74 as the drive shaft 44 rotates.

The application of fluid pressure to the upper compartment 72 produces axial movement of the piston sleeve 62 toward the body lower end 42. The application of fluid pressure to the lower compartment 74 produces axial movement of the piston sleeve 62 toward the body upper end 40. The actuator provides relative rotational movement between the body 36 and the drive shaft 4 through the conversion of linear movement of the piston sleeve 62 into rotational movement of the drive shaft, in a manner well known in the art.

In the illustrated embodiment of the left actuator 32 shown in FIG. 2, an inward-facing surface portion of the body sidewall 38 has cut therein inner helical splines, and an outward-facing surface portion of the elongated shaft portion 46 of the drive shaft 44 has cut therein outer helical splines. The sleeve portion 68 of the piston sleeve 62 has cut in an outward-facing surface portion thereof outer helical splines which mesh with the inner helical splines of the body 36, and has cut in an inward-facing surface portion thereof inner helical splines which mesh with the outer helical splines of the drive shaft 44. The co-action of the pairs of meshing splines comprises the linear-to-rotary conversion means which produces rotation of the drive shaft 44 as the torque-transmitting piston sleeve 62 reciprocates.

The piston sleeve 62 is mounted for reciprocal longitudinal movement within the body, and engages both the body 36 and the drive shaft 44. Longitudinal movement of the piston sleeve 62 toward the body upper end 40 is translated into rotational movement of the drive shaft relative to the body in a first rotational direction, and longitudinal movement of the piston sleeve toward the body lower end 42 is translated into rotational movement of the drive shaft relative to the body in a second rotational direction opposite the first rotational direction.

It is noted that the pitch and leads for the two pairs of meshing splines may differ to produce the desired output characteristics of the actuator. Alternative linear-to-rotary conversion means may be used, such as a ball and groove arrangement or a roller and spindle arrangement.

In the illustrated embodiment of the left actuator 32, the end cap 60 and the body sidewall 38 toward the body upper end 40 have confronting and corresponding circular ball races integrally formed therein with a plurality of balls disposed between the races. Similarly, the shaft flange portion 48 and the body sidewall 38 toward the body lower end 42 have confronting and corresponding circular ball races integrally formed therein with a plurality of balls disposed between the races. The races and balls disposed therein serve to rotatably support the drive shaft 44 against both radial and axial thrust loads.

In the illustrated embodiment of the invention, the left and right actuators 32 and 36 are mounted to the frame 12 with their longitudinal axes aligned substantially vertically with the shaft flange portion 48 of the drive shaft 44 at the body lower end 42. As such, when the vehicle 10 is carrying a heavy load, the large axial thrust loading is handled by the ball races of the shaft flange portion 48 and the body sidewall 38 at the body lower end 42.

Each of the left and right wheel brackets 54 and 56 has a corresponding one of the left and right wheels 28 and 30 mounted thereto to rollingly support the frame 12. In the illustrated embodiment of the invention, each of the wheel brackets 54 and 56 has a generally horizontal portion 80 which is bolted to the drive shaft mounting surface 50 by the bolts 58, and a generally vertical portion 82 with an aperture 84 therethrough to receive a conventional wheel support assembly 86. This assembly 86 includes a spindle 88 to which the left or right wheel 28 or 30 is attached in a conventional manner using a spindle nut 90. In the illustrated embodiment, a hydraulic motor 92 is supported by the left wheel bracket 54 to provide drive to the left wheel 28. A conventional brake 94 is supported by the right wheel bracket 56 to provide braking for the right wheel 30.

The horizontal and vertical portions 80 and 82 of the wheel brackets 54 and 56 are each formed from a single piece of bent metal stock, and a gusset 96 is rigidly attached to both portions to provide rigidity. While in the illustrated embodiment of the invention the wheel brackets 54 and 56 are illustrated as separate components from the drive shafts 44 to which attached, they can be formed integral with the drive shafts. For compactness, the hydraulic motor 92 and the brake 94 are mounted directly below the left and right actuators 32 and 34, respectively, and within the area generally defined by the horizontal and vertical portions 80 and 82 and the gusset 96 of the wheel brackets 54 and 56.

The support frame 12 includes a left mounting pad 100 located at the left side 24 of the frame front end 20 and a right mounting pad 102 located at the right side 26 of the frame front end. Each of the mount pads 100 and 102 provides a flat mounting surface against which a flat side portion 104 of the bodies 36 of the left and right actuators 32 and 34 are positioned. Each of the bodies 36 is secured to a corresponding one of the mounting pads 100 and 102 by a pair of U-bolts 106 which are positioned within a pair of outwardly opening grooves 108 in outwardly projecting wall surfaces 107 of the body sidewall 38. One of the grooves 108 is located toward the body upper end 40 and the other is located toward the body lower end 42. The grooves 108 extend circumferentially about the wall surface of the bodies 36, except for the flat side portions 104 thereof. The ends of the U-bolts 106 extend through holes 110 in the mounting pads 100 and 102 and have threaded end portions which receive nuts 112 which hold the bodies 36 of the left and right actuators 32 and 34 securely in position against the mounting pads 100 and 102.

The drive shafts 44 of the left and right actuators 32 and 34 are each rotatable through at least 180° to allow selective steering of the left and right front wheels 28 and 30. The left and right actuators 32 and 34 are constructed so that each can turn the drive shaft thereof and the corresponding left and right front wheel 28 and 30 mounted thereto at least 90° to the left of the center position and at least 90° to the right of the center position. At the center position, the vehicle 10 moves in a straight line. The drive shafts 44 serve much the same function as a king pin.

Figure 3:
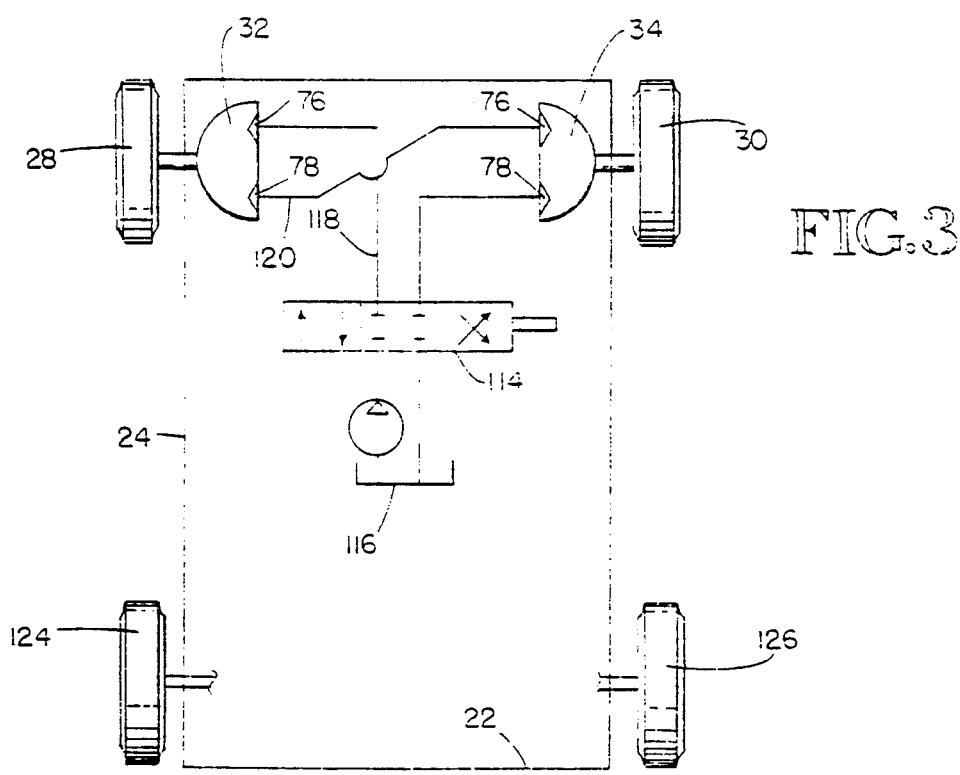
FIG. 3 is a schematic diagram of the hydraulic system of the utility vehicle of FIG. 1.

Fluid conduits interconnect the upper and lower ports 76 and 78 of the left and right actuators 32 and 34 for series operation using a fluid-control valve 114 for steering, as shown schematically in FIG. 3. A source 116 of pressurized hydraulic fluid is connected to the fluid-control valve 114. A first conduit 118 connecting the fluid-control valve 114 to the upper port 76 of the left actuator 32. A second conduit 120 connects the lower port 78 of the left actuator 32 to the upper port 76 of the right actuator 34. A third conduit 122 connects the lower port 78 of the right actuator 34 to the fluid-control valve 114. The fluid-control valve 114 is operable to selectively apply pressurized fluid to the first conduit 118 or the third conduit 122, and hence to the head portion 64 of the piston sleeve 62 of the left and right actuators 32 and 34 to simultaneously rotate the drive shafts 44 thereof and thereby turn the left and right front wheels 28 and 30 in unison and in substantially equal angular amounts to steer the frame 12 to the left or right.

By way of example, if the fluid-control valve 114 is operated to apply pressurized fluid to the first conduit 118, pressurized fluid is supplied to the upper port 76 of the left actuator 32 which causes the piston sleeve 62 thereof to be driven downward toward the body lower end 42. In the presently preferred embodiment of the invention, both the left and right actuators 32 and 36 are similarly splined so that downward movement of the piston sleeves 64 causes the drive shafts 44 to rotate counterclockwise when viewed from above, and hence upward movement of the piston sleeve causes clockwise rotation. As such, when pressurized fluid enters the upper compartment 72 via the upper port 76 of the left actuator 32, and the piston sleeve 62 is driven downward, the drive shaft 44 rotates counterclockwise and the left front wheel 28 turns to the left. This downward movement of the piston sleeve 62 forces the fluid in the lower compartment 74 under pressure out of the lower port 78 of the left actuator 32. The pressurized fluid is conducted via the second conduit 120 to the upper port 76 of the right actuator 34. As with the left actuator 32, when pressurized fluid enters the upper compartment 72 via the upper port 76 of the right actuator 34, the piston sleeve 62 thereof is driven downward. This rotates the drive shaft 44 of the right actuator 34 counterclockwise and the right front wheel 30 turns to the left. As with the left actuator 32, the downward movement of the piston sleeve 62 of the right actuator 34 forces the fluid in the lower compartment 74 thereof under pressure out of the lower port 78. The pressurized fluid is conducted via the third conduit 122 to the fluid-control valve 114 for return to the source 116.

Since both the left and right actuators 32 and 34 have the same internal displacement and are sealed against leakage with various seals, the pressure applied to the upper port 76 of the left actuator 32 will cause substantially the same fluid pressure to be applied to the upper port 76 of the right actuator 34. This results in the drive shafts 44 of both actuators, and the left and right front wheels 28 and 30 turned thereby, to be turned in equal amounts. Of course, the amount of turning depends upon the length of time and amount of pressure that is applied to the actuators.

The process just described above when pressurized fluid is applied to the first conduit 118 is repeated when the pressurized fluid is applied to the third conduit 122, except that the fluid causes the piston sleeves 62 of the left and right actuators 32 and 34 to move upward and rotate the drive shafts 44 clockwise, and hence turn the left and right front wheels 28 and 30 to the right. In such manner, the left and right front wheels 28 and 30 can be steered using a single fluid-control valve 114, with the steering range being at least 90° to the left and right of the center position. This produces vastly improved maneuverability for the vehicle 10. The steering system of the present invention is particularly helpful for utility vehicles which have their performance improved by being able to make very small radius turns when maneuvering in tight situations. Since the left and right front wheels 28 and 30 can be turned as much as 90° from the center position, and it is desired to do so without moving the vehicle forward, at least one of the front wheels 28 or 30 must be provided with drive. As previously described, in the illustrated embodiment drive is provided to the left front wheel 28 by the hydraulically powered drive motor 92. Similarly, it is desirable to provide a brake for at least one of the wheels 28 or 30. As previously described, braking is provided by the brake 94 connected to the right front wheel 30.

In the illustrated embodiment of the invention, the steering system is shown installed on the front wheels 28 and 30 at the frame front end 20. The vehicle 10 also includes a pair of left and right rear wheels 124 and 126, respectively. The left rear wheel is positioned toward the left side 24 of the frame rear end 22, and the right rear wheel 126 is positioned toward the right side 26 of the frame rear end. The left and right rear wheels 124 and 126 can utilize the same steering system of the present invention just described for the left and right front wheels 28 and 30 to provide maximum steering control for the vehicle 10. Alternatively, either the front wheels or the rear wheels can utilize a conventional non-steerable arrangement and be powered in a conventional manner. When the steering system of the present invention is provided for both the front and rear wheels, a separate fluid-control valve 114 is provided for the sets of wheels to allow each set to be steered independently. This allows the operator of the vehicle 10 to maneuver in a manner not previously possible for self-propelled scissor lifts and other utility vehicles presently on the market.

I claim:

1. A utility vehicle, comprising:

an elongated support frame extending between first and second frame ends and having left and right sides;

a pair of left and right first end wheels, said left first wheel being positioned toward said left side of said frame first end, and said right first wheel being positioned toward said right side of said frame first end;

a pair of left and right fluid-powered rotary actuators, said left actuator being positioned toward said left side of said frame first end, and said right actuator being positioned toward said right side of said frame first end, each of said actuators including:

a body rigidly attached to said frame, said body having a longitudinal axis, and body upper and lower ends;

first and second fluid ports for introducing pressurized fluid within said body at longitudinally spaced-apart locations;

a drive member extending generally longitudinally and co-axially within said body, said drive member being supported for rotational movement relative to said body, said drive member having an attachment portion at said body lower end;

a piston mounted within said body with said first port in fluid communication with one side thereof and said second port in fluid communication with an opposite side thereof to produce reciprocal longitudinal movement of said piston within said body in response to selective application of pressurized fluid to said first and second ports; and a torque-transmitting member mounted for reciprocal longitudinal movement within said body, said torque-transmitting member engaging said body and said drive member to translate longitudinal movement of said piston toward said body upper end into rotational movement of said drive member relative to said body in a first rotational direction, and longitudinal movement of said piston toward said body lower end into rotational movement of said drive member relative to said body in a second rotational direction opposite said first rotational direction;

a pair of left and right wheel brackets, said left wheel bracket being mounted to said attachment portion of said left actuator for rotation therewith, and said right wheel bracket being mounted to said attachment portion of said right actuator for rotation therewith, said left first wheel being rotatably mounted to said left first wheel bracket in a position to rollingly support said frame, and said right first wheel being rotatably mounted to said right wheel bracket in a position to rollingly support said frame, said left and right wheel brackets being rotatable by said left and right actuators to turn said left and right first wheels to steer said frame to the left or right;

a motor supported by one of said left or right wheel brackets and drivably coupled to a corresponding one of said left or right first wheels to provide rotational drive power thereto;

a fluid-control valve;

a source of pressurized fluid connected to said fluid-control valve;

fluid conduit interconnecting said first and second ports of said left and right actuators for series operation, said fluid conduit including a first conduit connecting said fluid-control valve to said first port of said left actuator, a second conduit connecting said second port of said left actuator to said first port of said right actuator, and a third conduit connecting said second port of said right actuator to said fluid-control valve, said fluid-control valve being operable to selectively apply pressurized fluid to said first conduit or said third conduit and hence to said pistons of said left and right actuators to simultaneously rotate said drive members and thereby turn said left and right first wheels in unison and in substantially equal angular amounts to steer said frame to the left or right; and at least one second end wheel mounted to said frame toward said frame second end in position to rollingly support said frame.

2. The vehicle of claim 1 wherein said left and right actuators are oriented generally vertically and each is positioned above a corresponding one of said left and right wheel brackets, and wherein said left and right wheel brackets each have first and second portions, said first portion being oriented generally horizontally and rigidly attached to said attachment portion of a corresponding one of said left or right actuators, and said second portion being oriented generally vertically and having a corresponding one of said left or right first wheels rotatably mounted thereto.

3. The vehicle of claim 1 wherein said drive members of said left and right actuators are rotatable through at least 180° to allow selective steering of said left and right first wheels at least 90° to the left and at least 90° to the right from a center position at which the vehicle moves in a straight line.

4. The vehicle of claim 1 wherein said support frame includes a left mounting pad located at said left side of said frame first end and a right mounting paid located at said right side of said frame first end, and said bodies of said left and right actuators each has a flat side portion positionable against a corresponding one of said left and right mounting pads, and the vehicle further includes members which hold said flat side portions of said bodies in fixed position against said mounting pads.

5. The vehicle of claim 4 wherein said bodies each have at least one outwardly open groove in an outer wall surface thereof which extends circumferentially at least partially about said outer wall surface, and said members include U-bolts which are positioned in said body grooves and securely attached to said frame.

6. A utility vehicle, comprising:

a support frame extending between first and second ends and having left and right sides;

a pair of left and right first end wheels, said left first wheel being positioned toward said left side of said frame first end, and said right first wheel being positioned toward said right side of said frame first end;

a pair of left and right fluid-powered rotary actuators, said left actuator being positioned toward said left side of said frame first end, and said right actuator being positioned toward said right side of said frame first end, each of said actuators including:

a body having a longitudinal axis, and a pair of body ends;

first and second fluid ports for introducing pressurized fluid within said body at longitudinally spaced-apart locations;

a drive member extending generally longitudinally and co-axially within said body, said drive member being supported for rotational movement relative to said body;

a piston mounted within said body with said first port in fluid communication with one side thereof and said second port in fluid communication with an opposite side thereof to produce reciprocal longitudinal movement of said piston within said body in response to selective application of pressurized fluid to said first and second ports; and a torque-transmitting member mounted for reciprocal longitudinal movement within said body, said torque-transmitting member engaging said body and said drive member to translate longitudinal movement of said piston toward one of said body ends into rotational movement of said drive member relative to said body in a first rotational direction, and longitudinal movement of said piston toward the other of said body ends into rotational movement of said drive member relative to said body in a second rotational direction opposite said first rotational direction, one of said body or drive member being rigidly attached to said frame and the other having an attachment portion rotatable relative to said frame;

a pair of left and right wheel brackets, said left wheel bracket being mounted to said attachment portion of said left actuator for rotation therewith, and said right wheel bracket being mounted to said attachment portion of said right actuator for rotation therewith, said left first wheel being rotatably mounted to said left first wheel bracket in a position to rollingly support said frame, and said right first wheel being rotatably mounted to said right wheel bracket in a position to rollingly support said frame, said left and right wheel brackets being rotatable by said left and right actuators to turn said left and right first wheels to steer said frame to the left or right;

a fluid-control valve;

a source of pressurized fluid connected to said fluid-control valve;

fluid conduit interconnecting said first and second ports of said left and right actuators for series operation, said fluid conduit including a first conduit connecting said fluid-control valve to said first port of said left actuator, a second conduit connecting said second port of said left actuator to said first port of said right actuator, and a third conduit connecting said second port of said right actuator to said fluid-control valve, said fluid-control valve being operable to selectively apply pressurized fluid to said first conduit or said third conduit and hence to said pistons of said left and right actuators to simultaneously rotate said attachment portions and thereby turn said left and right first wheels in unison and in substantially equal angular amounts to steer said frame to the left or right; and at least one second end wheel mounted to said frame toward said frame second end in position to rollingly support said frame.

7. The vehicle of claim 6 wherein said left and right actuators are oriented generally vertically and each is positioned above a corresponding one of said left and right wheel brackets, and wherein said left and right wheel brackets each have first and second portions, said first portion being oriented generally horizontally and rigidly attached to said attachment portion of a corresponding one of said left or right actuators, and said second portion being oriented generally vertically and having a corresponding one of said left or right first wheels rotatably mounted thereto.

8. The vehicle of claim 6 wherein said drive members of said left and right actuators are rotatable through at least 180° to allow selective steering of said left and right first wheels at least 90° to the left and at least 90° to the right from a center position at which the vehicle moves in a straight line.

9. The vehicle of claim 6 wherein said support frame includes a left mounting pad located at said left side of said frame first end and a right mounting paid located at said right side of said frame first end, and said bodies of said left and right actuators each has a flat side portion positionable against a corresponding one of said left and right mounting pads, and the vehicle further includes members which hold said flat side portions of said bodies in fixed position against said mounting pads.

10. The vehicle of claim 9 wherein said bodies each have at least one outwardly open groove in an outer wall surface thereof which extends circumferentially at least partially about said outer wall surface, and said members include U-bolts which are positioned in said body grooves and securely attached to said frame.

* * * * *

UNITED STATES PATENT AND TRADEMARK OFFICE
CERTIFICATE OF CORRECTION

PATENT NO. : 5,148,885

DATED : September 22, 1992

INVENTOR(S) : Paul P. Weyer

It is certified that error appears in the above-identified patent and that said Letters Patent is hereby corrected as shown below:

In column 9, claim 4, line 50, please delete "paid" and substitute therefor -- pad --.

In column 12, claim 9, line 9, please delete "paid" and substitute therefor -- pad --.

Signed and Sealed this

Fifth Day of October, 1993

Attest:

BRUCE LEHMAN

Attesting Officer    Commissioner of Patents and Trademarks